(12) United States Patent
Li

(10) Patent No.: US 11,276,068 B2
(45) Date of Patent: *Mar. 15, 2022

(54) FRAUDULENT TRANSACTION IDENTIFICATION METHOD AND APPARATUS, SERVER, AND STORAGE MEDIUM

(71) Applicant: Advanced New Technologies Co., Ltd., Grand Cayman (KY)

(72) Inventor: Longfei Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/221,482

(22) Filed: Apr. 2, 2021

(65) Prior Publication Data

US 2021/0224812 A1 Jul. 22, 2021

Related U.S. Application Data

(63) Continuation of application No. 16/355,439, filed on Mar. 15, 2019, now Pat. No. 10,970,719.

(30) Foreign Application Priority Data

Mar. 15, 2018 (CN) .......................... 201810214431.6

(51) Int. Cl.
*G06Q 20/40* (2012.01)
*G06K 9/62* (2006.01)
(Continued)

(52) U.S. Cl.
CPC ....... *G06Q 20/4016* (2013.01); *G06K 9/6256* (2013.01); *G06N 3/049* (2013.01);
(Continued)

(58) Field of Classification Search
CPC .............. G06Q 20/4016; G06Q 20/02; G06Q 20/0855; G06Q 20/382; G06K 9/6256; G06N 3/0445; G06N 3/049; G06N 3/08
See application file for complete search history.

(56) References Cited

U.S. PATENT DOCUMENTS

| 5,822,741 A | 10/1998 | Fischthal |
| 6,330,546 B1 * | 12/2001 | Gopinathan ........... G06Q 20/00 |
| | | 705/35 |

(Continued)

FOREIGN PATENT DOCUMENTS

| CN | 103544429 | 1/2014 |
| CN | 104318435 | 1/2015 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Abdullah Al Kawsar
*Assistant Examiner* — Ahsif A. Sheikh
(74) *Attorney, Agent, or Firm* — Fish & Richardson P.C.

(57) ABSTRACT

Techniques for identifying fraudulent transactions are described. In one example method, an operation sequence and time difference information associated with a transaction are identified by a server. A probability that the transaction is a fraudulent transaction is predicted based on a result provided by a deep learning network, where the deep learning network is trained to predict fraudulent transactions based on operation sequences and time differences associated with a plurality of transaction samples, and where the deep learning network provides the result in response to (Continued)

input including the operation sequence and the time difference information associated with the transaction.

20 Claims, 8 Drawing Sheets

(51) Int. Cl.
    *G06N 3/04*     (2006.01)
    *G06N 3/08*     (2006.01)
    *G06Q 20/02*     (2012.01)
    *G06Q 20/38*     (2012.01)
    *G06Q 20/08*     (2012.01)

(52) U.S. Cl.
    CPC ............. *G06N 3/0445* (2013.01); *G06N 3/08* (2013.01); *G06Q 20/02* (2013.01); *G06Q 20/0855* (2013.01); *G06Q 20/382* (2013.01)

(56) References Cited

U.S. PATENT DOCUMENTS

| | | | |
|---|---|---|---|
| 6,714,918 B2 | 3/2004 | Hillmer et al. | |
| 7,194,471 B1* | 3/2007 | Nagatsuka | G06F 16/355 |
| 7,512,221 B2 | 3/2009 | Toms | |
| 7,599,856 B2 | 10/2009 | Agrawal et al. | |
| 8,311,907 B2 | 11/2012 | Klein et al. | |
| 8,533,825 B1* | 9/2013 | Marsa | H04L 63/1425 |
| | | | 726/22 |
| 2008/0162202 A1 | 7/2008 | Khanna et al. | |
| 2009/0063354 A1 | 3/2009 | Sheets et al. | |
| 2010/0280882 A1 | 11/2010 | Faith et al. | |
| 2013/0204755 A1 | 8/2013 | Zoldi et al. | |
| 2017/0372317 A1 | 12/2017 | Wang et al. | |
| 2017/0372318 A1* | 12/2017 | Shami | G06F 16/332 |
| 2018/0046920 A1* | 2/2018 | Yang | G06N 3/0445 |
| 2018/0300465 A1 | 10/2018 | Esman | |
| 2019/0287114 A1 | 9/2019 | Li | |

FOREIGN PATENT DOCUMENTS

| | | |
|---|---|---|
| CN | 107785058 | 3/2018 |
| TW | 201338606 | 9/2013 |

OTHER PUBLICATIONS

International Preliminary Report on Patentability in International Application No. PCT/US2019/022512, dated Sep. 15, 2020, 7 pages.

International Search Report and Written Opinion in International Application No. PCT/US2019/022512, dated Jun. 5, 2019, 11 pages.

Nakamoto, "Bitcoin: A Peer-to-Peer Electronic Cash System," www.bitcoin.org, 2005, 9 pages.

Wang et al., "Session-Based Fraud Detection in Online E-commerce Transactions Using Recurrent Neural Networks," ECML PKDD 2017: Machine Learning and Knowledge Discovery in Databases, Jan. 2017, pp. 241-252.

\* cited by examiner

US 11,276,068 B2

FRAUDULENT TRANSACTION IDENTIFICATION METHOD AND APPARATUS, SERVER, AND STORAGE MEDIUM

CROSS-REFERENCE TO RELATED APPLICATIONS

This application is a continuation of U.S. patent application Ser. No. 16/355,439, filed Mar. 15, 2019, which claims priority to Chinese Patent Application No. 201810214431.6, filed on Mar. 15, 2018, which is hereby incorporated by reference in its entirety.

TECHNICAL FIELD

Implementations of the present specification relate to the field of machine learning technologies, and in particular, to a fraudulent transaction identification method and apparatus, a server, and a storage medium.

BACKGROUND

The development of network transactions is accompanied with various frauds. Fraudsters use some information about victims to cheat the victims and induce them to transfer money to designated accounts or bank cards. This causes huge losses to the victims. Thus, how to identify these fraudulent transactions is very important in financial security.

SUMMARY

Implementations of the present specification provide a fraudulent transaction identification method and apparatus, a server, and a storage medium.

According to a first aspect, an implementation of the present specification provides a fraudulent transaction identification method, including the following: obtaining an operation sequence of a transaction to be identified and time difference information of adjacent operations; and predicting, based on the operation sequence and the time difference information and based on a deep learning network, the probability that the transaction to be identified is a fraudulent transaction, where the deep learning network is obtained by performing training in advance based on an operation sequence and a time difference similarity of a transaction sample.

According to a second aspect, an implementation of the present specification provides a deep learning network training method, and the method is used for fraudulent transaction identification and includes the following: obtaining a black sample and a white sample of a transaction, and separately extracting operation sequences of the black sample and the white sample and time difference information of adjacent operations; separately performing feature conversion and selection on the sample operation sequence and the time difference information to obtain an operation feature and a time difference feature; calculating a similarity between the operation feature and the time difference feature; combining a plurality of operation features based on the similarity, to obtain a combined operation feature; and training a deep learning network through classification based on the combined operation feature.

According to a third aspect, an implementation of the present specification provides a fraudulent transaction identification apparatus, including the following: an information acquisition unit, configured to obtain an operation sequence of a transaction to be identified and time difference information of adjacent operations; and a prediction unit, configured to predict, based on the operation sequence and the time difference information and based on a deep learning network, the probability that the transaction to be identified is a fraudulent transaction, where the deep learning network is obtained by performing training in advance based on an operation sequence and a time difference similarity of a transaction sample.

According to a fourth aspect, an implementation of the present specification provides a deep learning network training apparatus, and the apparatus is used for fraudulent transaction identification and includes the following: a sample acquisition and extraction unit, configured to obtain a black sample and a white sample of a transaction, and separately extract operation sequences of the black sample and the white sample and time difference information of adjacent operations; a feature conversion unit, configured to separately perform feature conversion and selection on the sample operation sequence and the time difference information to obtain an operation feature and a time difference feature; a similarity calculation unit, configured to calculate a similarity between the operation feature and the time difference feature; a feature combination unit, configured to combine a plurality of operation features based on the similarity, to obtain a combined operation feature; and a classification training unit, configured to train a deep learning network through classification based on the combined operation feature.

According to a fifth aspect, an implementation of the present specification provides a server, including a memory, a processor, and a computer program that is stored in the memory and that can run on the processor, where when executing the program, the processor performs the steps of any described method.

According to a sixth aspect, an implementation of the present specification provides a computer readable storage medium, where the computer readable storage medium stores a computer program, and when the program is executed by a processor, the steps of any described method are performed.

The implementations of the present specification have the following beneficial effects:

In the implementations of the present invention, by combining a time factor and a deep learning network, a time-focused deep learning network is innovatively provided for fraudulent transaction identification, to find some associations of transaction operations in terms of time, thereby better identifying a fraudulent transaction.

DESCRIPTION OF IMPLEMENTATIONS

To better understand the previous technical solutions, the following describes the technical solutions in the implementations of the present specification in detail by using the accompanying drawings and specific implementations. It should be understood that the implementations of the present specification and the specific features in the implementations are detailed descriptions of the technical solutions in the implementations of the present specification, and are not intended to limit the technical solutions of the present specification. The implementations of the present specification and the technical features in the implementations can be mutually combined without conflicts.

Figure 1:
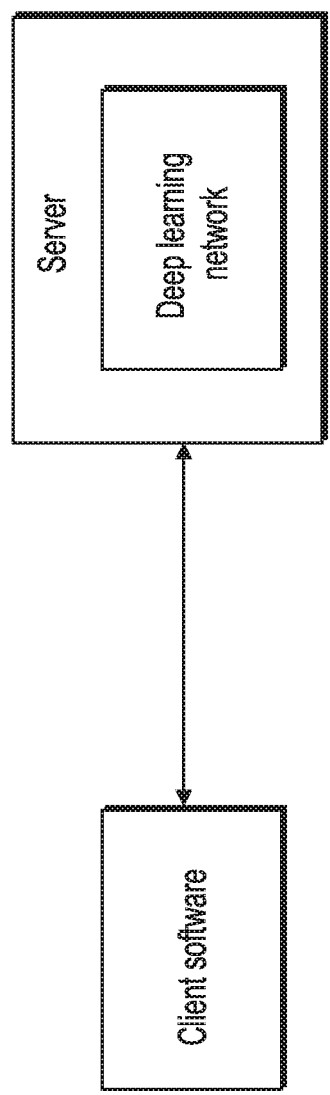
FIG. 1 is a schematic diagram illustrating a scenario of a fraudulent transaction identification method, according to an implementation of the present specification.

FIG. 1 is a schematic diagram illustrating a fraudulent transaction identification scenario, according to an implementation of the present specification. Client (user side) proposes a transaction processing request to a server (network side), and the server parses the transaction processing request, and performs time-difference based exception identification on the transaction processing request. The server obtains a deep learning network by performing training in advance based on an operation sequence and a time difference similarity of a transaction sample, and predicts, by using the deep learning network, the probability that a transaction to be identified is a fraudulent transaction.

Figure 2:
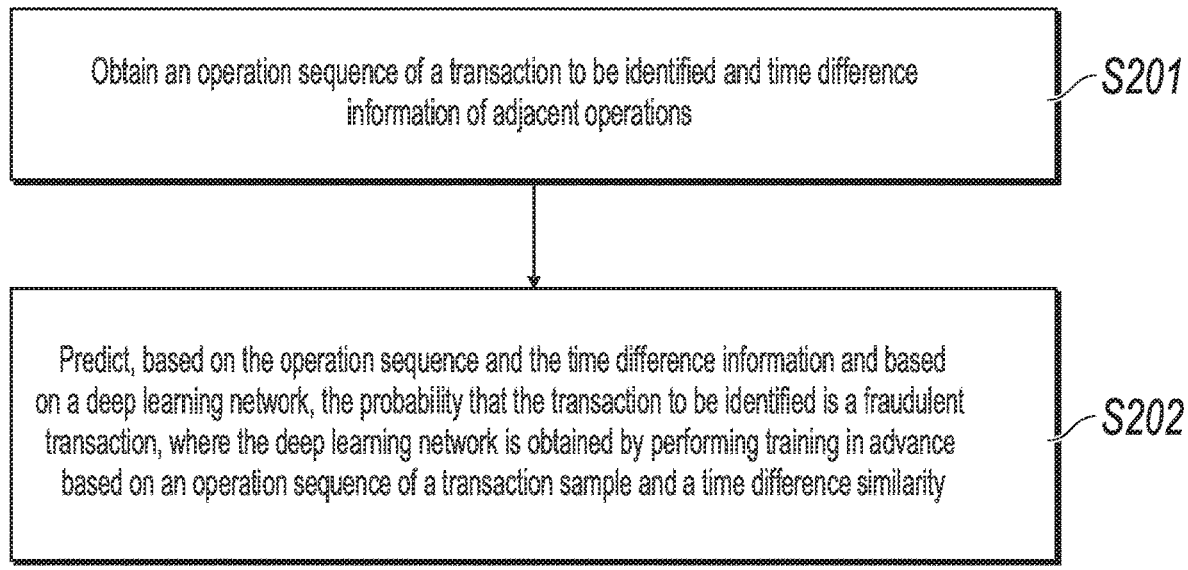
FIG. 2 is a flowchart illustrating a fraudulent transaction identification method, according to a first aspect of the implementations of the present specification.

According to a first aspect, an implementation of the present specification provides a fraudulent transaction identification method. Referring to FIG. 2, the method includes the following steps:

S201. Obtain an operation sequence of a transaction to be identified and time difference information of adjacent operations.

S202. Predict, based on the operation sequence and the time difference information and based on a deep learning network, the probability that the transaction to be identified is a fraudulent transaction, where the deep learning network is obtained by performing training in advance based on an operation sequence and a time difference similarity of a transaction sample.

In the present implementation of the present invention, a time factor is considered in a fraudulent transaction identification process, so that a fraudulent transaction can be better identified. This is because a fraudulent transaction usually includes a plurality of operations periodically initiated by a machine. For example, a typical operation sequence of a fraud account is always A, B, C, D, A, B, C, D, and ABCD each is a specific operation. There seems to be no problem merely in terms of sequence, and many users perform operations in this way, but some problems can be identified after a time interval is considered. Usually, two operations of a user have a random time difference, but a time difference between two operations of the described user is basically stable, which is likely performed by a machine instead of a person. After checking, it is identified that the user is a fraudulent robot, which constantly sends collection requests to deceive others into transferring money.

As described above, whether the transaction to be identified is a fraudulent transaction is identified based on the deep learning network. Therefore, the deep learning network needs to be trained in advance before actual identification.

In an optional method, a process of training the deep learning network includes the following.

(1) Obtain a black sample and a white sample of a transaction, and separately extract operation sequences of the black sample and the white sample and time difference information of adjacent operations.

The black sample of a transaction is determined as a sample of a fraudulent transaction; and the white sample of a transaction is determined as a sample of a non-fraudulent transaction. The operation sequence is an operation identifier (for example, code or a sequence number) involved in the transaction; and the time difference information is a time difference between two adjacent operations.

(2) Separately perform feature conversion and selection on the sample operation sequence and the time difference information to obtain an operation feature and a time difference feature.

For example, feature conversion is first performed on the operation sequence and the time difference information to obtain an initial operation feature and an initial time feature, and then dimension reduction and irrelevant feature removal operations are separately performed on the initial operation feature and the initial time feature to select the operation feature and the time difference feature.

(3) Calculate a similarity between the operation feature and the time difference feature.

For example, an inner product of an operation feature matrix of the operation feature and a time difference feature matrix of the time difference feature is calculated to obtain the similarity between the operation feature and the time difference feature.

(4) Combine a plurality of operation features based on the similarity, to obtain a combined operation feature.

For example, the plurality of operation features are combined by calculating a sum of corresponding similarities or by taking a maximum value of corresponding similarities.

(5) Train the deep learning network through classification based on the combined operation feature.

For example, the deep learning network can be trained based on algorithms such as a recurrent neural network (RNN) algorithm, a long short-term memory (LSTM) algorithm, a gated recurrent unit (GRU) algorithm, or a simple recurrent unit (SRU) algorithm.

It can be seen that in the present implementation of the present invention, by combining the time factor and the deep learning network, a time-focused deep learning network is innovatively provided for fraudulent transaction identification, to find some associations of transaction operations in terms of time, thereby better identifying a fraudulent transaction.

According to a second aspect based on the same invention concept, an implementation of the present specification provides a deep learning network training method for fraudulent transaction identification.

Figure 3:
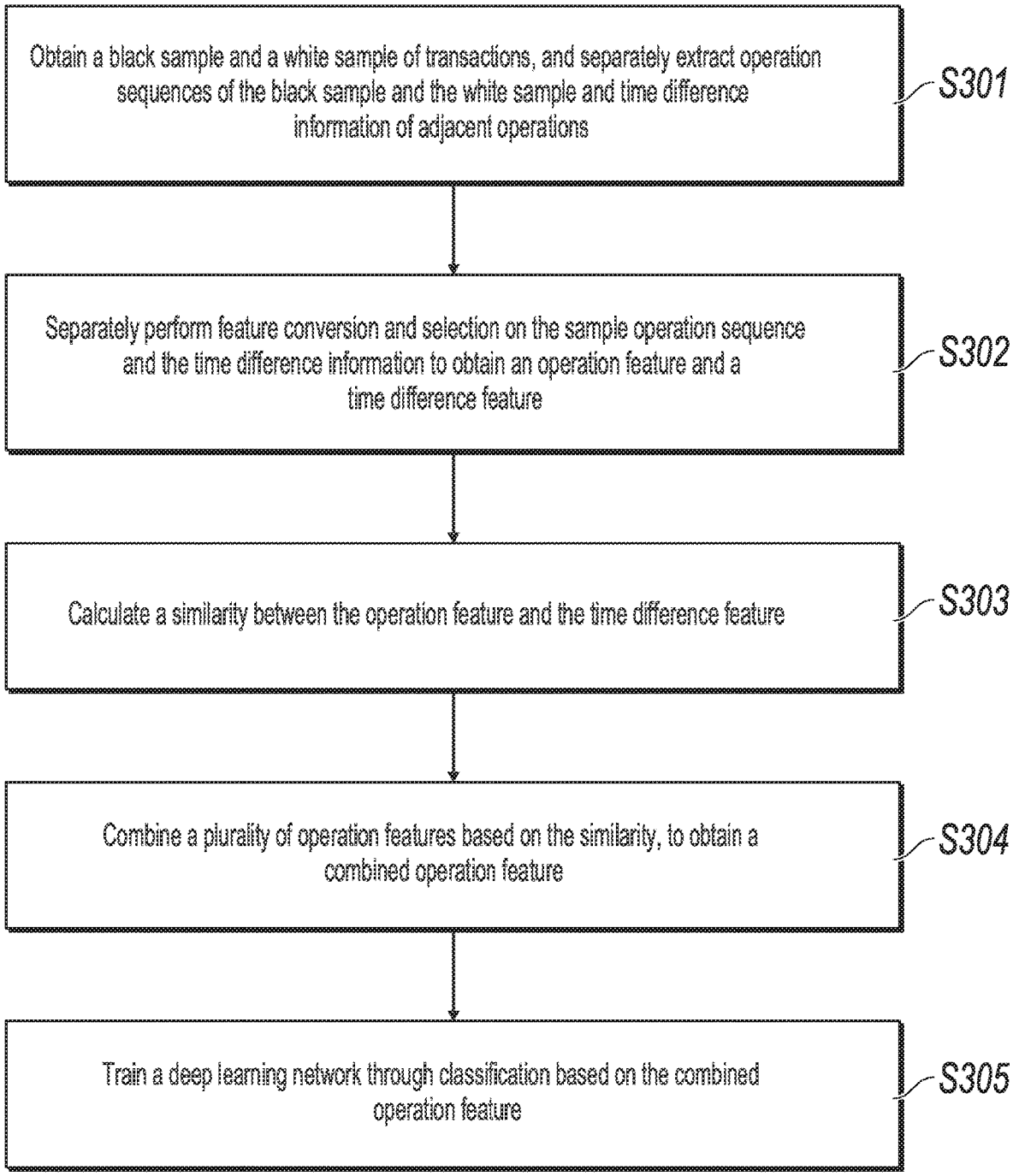
FIG. 3 is a flowchart illustrating a deep learning network training method, according to a second aspect of the implementations of the present specification.

Referring to FIG. 3, the method includes S301 to S305.

S301. Obtain a black sample and a white sample of a transaction, and separately extract operation sequences of the black sample and the white sample and time difference information of adjacent operations.

The black sample of a transaction is determined as a sample of a fraudulent transaction; and the white sample of a transaction is determined as a sample of a non-fraudulent transaction. The operation sequence is an operation identifier (for example, code or a sequence number) involved in the transaction; and the time difference information is a time difference between two adjacent operations.

S302. Separately perform feature conversion and selection on the sample operation sequence and the time difference information to obtain an operation feature and a time difference feature.

For example, feature conversion is first performed on the operation sequence and the time difference information to obtain an initial operation feature and an initial time feature, and then dimension reduction and irrelevant feature removal operations are separately performed on the initial operation feature and the initial time feature to select the operation feature and the time difference feature.

S303. Calculate a similarity between the operation feature and the time difference feature.

For example, an inner product of an operation feature matrix of the operation feature and a time difference feature matrix of the time difference feature is calculated to obtain the similarity between the operation feature and the time difference feature.

S304. Combine a plurality of operation features based on the similarity, to obtain a combined operation feature.

For example, the plurality of operation features are combined by calculating a sum of corresponding similarities or by taking a maximum value of corresponding similarities.

S305. Train the deep learning network through classification based on the combined operation feature.

For example, the deep learning network can be trained based on algorithms such as a recurrent neural network (RNN) algorithm, a long short-term memory (LSTM) algorithm, a gated recurrent unit (GRU) algorithm, or a simple recurrent unit (SRU) algorithm.

Figure 4:
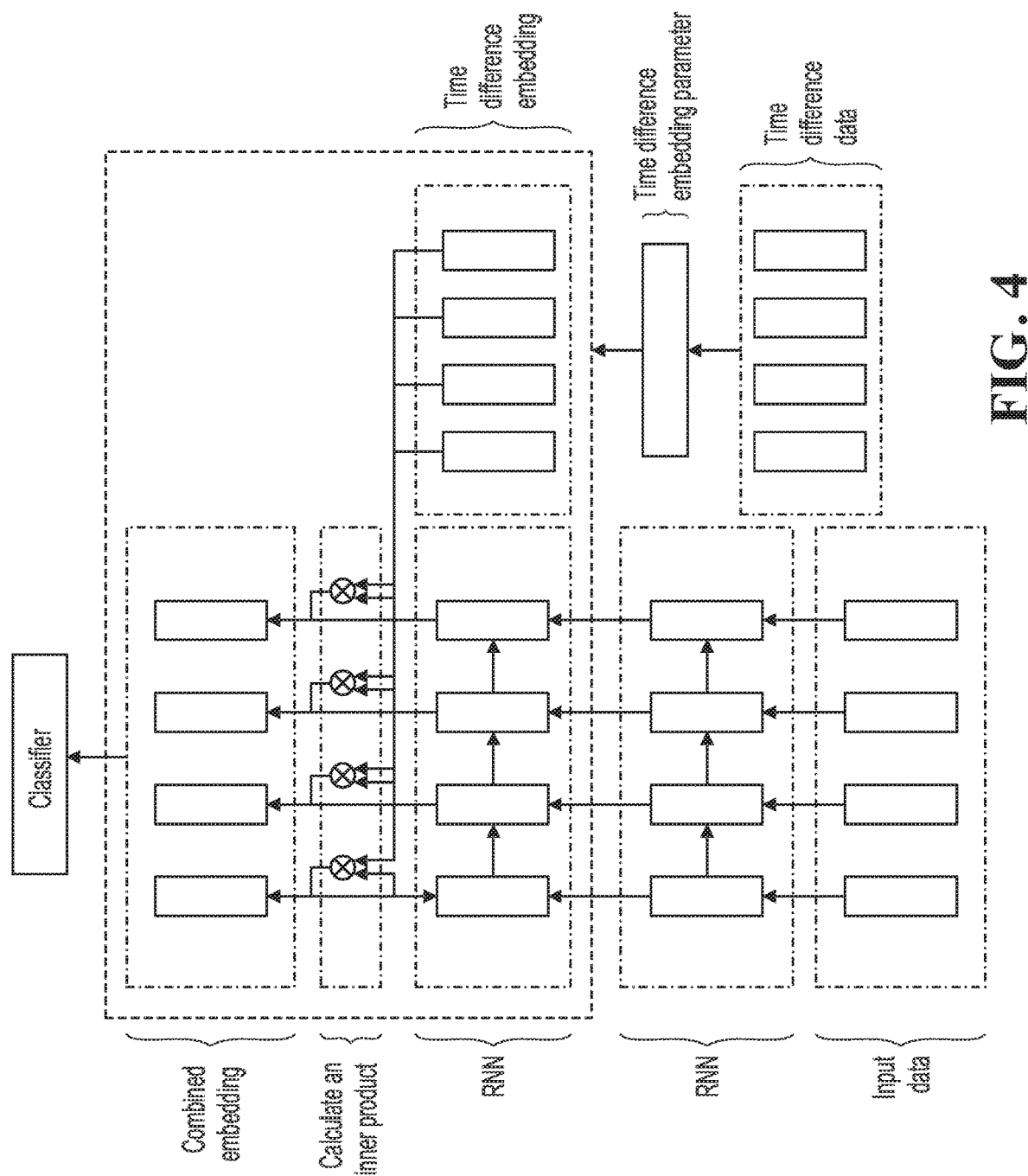
FIG. 4 is a schematic diagram illustrating an example of a deep learning network training method, according to a second aspect of the implementations of the present specification.

FIG. 4 is a schematic diagram illustrating an example of a deep learning network training method, according to a second aspect of the implementations of the present specification. In the present example, a deep learning network used for fraudulent transaction identification is trained based on an LSTM.

An example training process is described as follows:

1. Extract operation records of both parties of a transaction based on transaction time in a system, including an operation name and specific operation time.

2. Based on time and users of a fraudulent transaction that are recorded in a database, select some operations performed by the fraudulent user before the time, and chronologically sort the operations; number the operations, for example, number operation a as 1 and number operation b as 2; chronologically sort the data, for example, use D to represent the data, where each element is D_i; record time between each operation and a previous operation, and use T to represent the time, where each origin is T_i; and constitute a black sample in a training set by using the two pieces of data.

3. Randomly select, from time and users of a non-fraudulent transaction that are recorded in the database, some operations performed by the user before the time, and chronologically sort the operations; number the operations, for example, number operation a as 1 and number operation b as 2; chronologically sort the data and use D to represent the data, where each element is D_i; constitute a white sample in the training set; and record a time difference between two operations and use T to represent the time difference, where each origin is T_i.

4. Input processed data D into a long short-term memory model (LSTM). Different LSTM layers (for example, an LSTM layer, a full mesh layer, and a convolutional layer) can be added based on actual needs, to achieve a better effect through layer accumulation.

5. Obtain output at each moment of the LSTM to serve as an operation embedding parameter (embedding). The operation embedding is, for example, a two-dimensional matrix representing an operation feature.

6. Input data T into the model, and select the corresponding embedding based on time embedding for T. The time embedding is, for example, a two-dimensional matrix representing a time feature.

7. Calculate a similarity between operation embedding and time embedding of each corresponding time point. For example, the similarity is calculated by using an inner product as follows:

$$\phi(D_e^i, T_e^i) = \frac{(D_e^i \cdot T_e^i)}{\|D_e^i\|^2 * \|T_e^i\|^2}$$

8. Combine different embedding according to $\phi(D_e^i, T_e^i)$ by calculating a sum or taking a maximum value, for example, by using the following sum equation:

$$O = \Sigma_i \phi(D_e^i, T_e^i) \odot D_e^i$$

9. Place output O (namely, the previous combined operation feature) into a classifier for network training.

In the present implementation of the present invention, by combing a time factor and the LSTM, a time-focused long short-term memory is innovatively provided. The memory can be used for both sequence modeling and time modeling, and can find some associations in the data. Compared with a conventional global variable model, the performance is improved by about 10% during fraudulent transaction identification.

Figure 5:
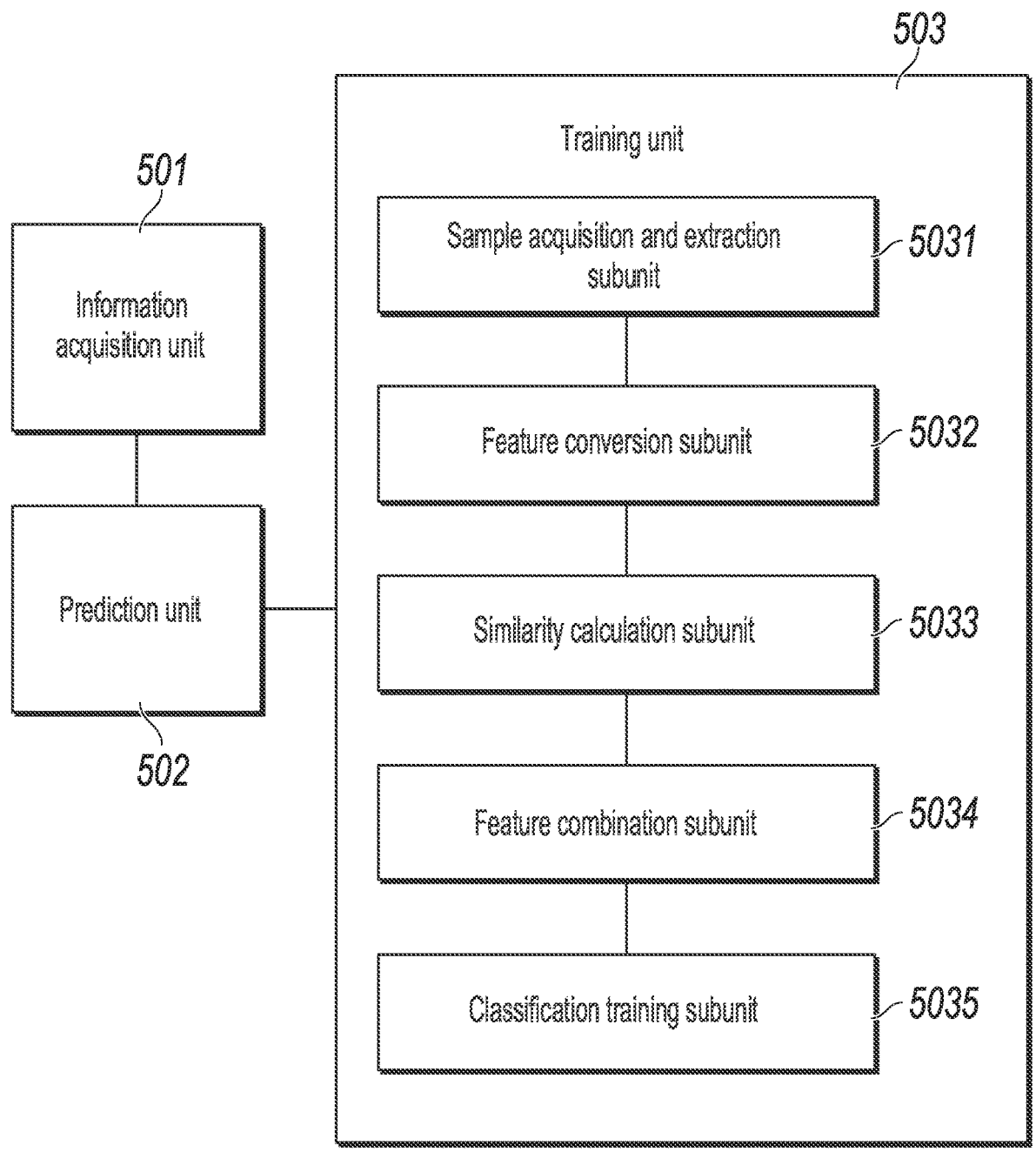
FIG. 5 is a schematic structural diagram illustrating a fraudulent transaction identification apparatus, according to a third aspect of the implementations of the present specification.

According to a third aspect, based on the same invention concept, an implementation of the present specification provides a fraudulent transaction identification apparatus. Referring to FIG. 5, the apparatus includes the following: an information acquisition unit 501, configured to obtain an operation sequence of a transaction to be identified and time difference information of adjacent operations; and a prediction unit 502, configured to predict, based on the operation sequence and the time difference information and based on a deep learning network, the probability that the transaction to be identified is a fraudulent transaction.

The deep learning network is obtained by performing training in advance based on an operation sequence and a time difference similarity of a transaction sample.

In an optional method, the apparatus further includes the following: a training unit 503, configured to train the deep learning network.

The training unit 503 includes the following: a sample acquisition and extraction subunit 5031, configured to obtain a black sample and a white sample of a transaction, and separately extract operation sequences of the black sample and the white sample and time difference information of adjacent operations; a feature conversion subunit 5032, configured to separately perform feature conversion and selection on the sample operation sequence and the time difference information to obtain an operation feature and a time difference feature; a similarity calculation subunit 5033, configured to calculate a similarity between the operation feature and the time difference feature; a feature combination subunit 5034, configured to combine a plurality of operation features based on the similarity, to obtain a combined operation feature; and a classification training subunit 5035, configured to train the deep learning network through classification based on the combined operation feature.

In an optional method, the feature conversion subunit 5032 is configured to perform feature conversion on the operation sequence and the time difference information to obtain an initial operation feature and an initial time feature; and separately perform dimension reduction and irrelevant feature removal operations on the initial operation feature and the initial time feature to select the operation feature and the time difference feature.

In an optional method, the similarity calculation subunit 5033 is configured to calculate an inner product of an operation feature matrix of the operation feature and a time difference feature matrix of the time difference feature to obtain the similarity between the operation feature and the time difference feature.

In an optional method, the feature combination subunit 5034 is configured to combine the plurality of operation features by calculating a sum of corresponding similarities or by taking a maximum value of corresponding similarities.

In an optional method, the training unit 503 trains the deep learning network based on an RNN algorithm, an LSTM algorithm, a GRU algorithm, or an SRU algorithm.

Figure 6:
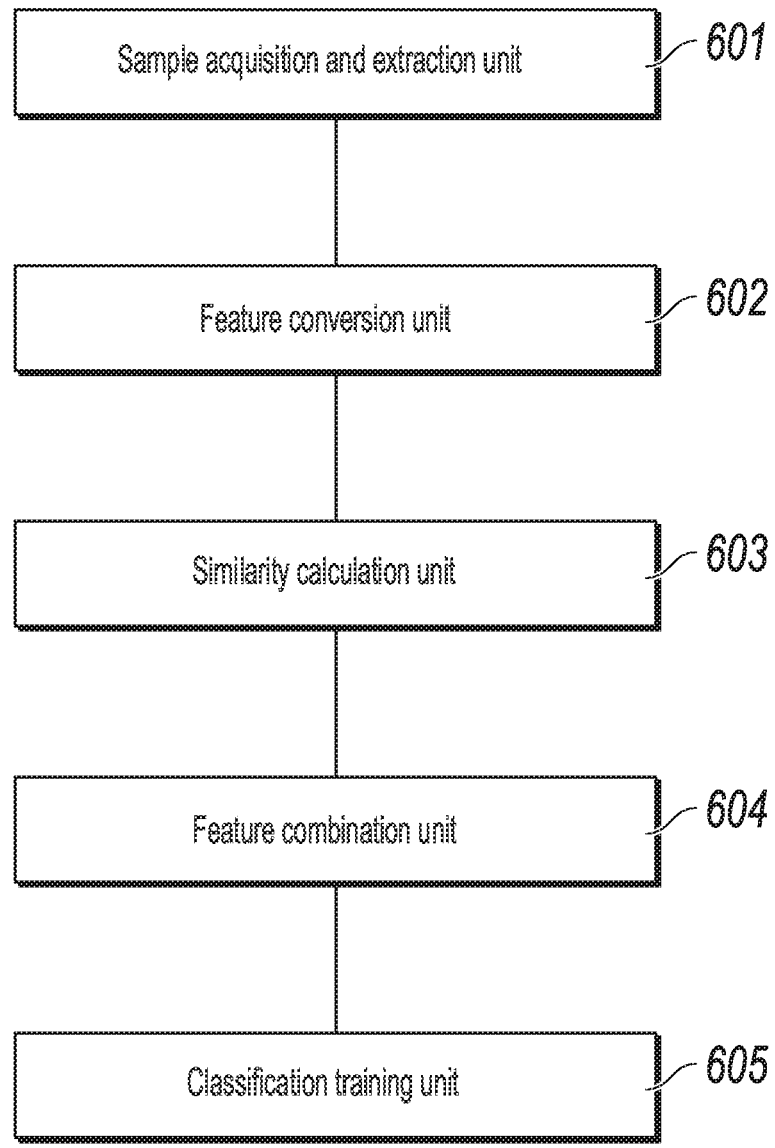
FIG. 6 is a schematic structural diagram illustrating a deep learning network training apparatus, according to a fourth aspect of the implementations of the present specification.

According to a fourth aspect, based on the same invention concept, an implementation of the present specification provides a deep learning network training apparatus. Referring to FIG. 6, the apparatus includes the following: a sample acquisition and extraction unit 601, configured to obtain a black sample and a white sample of a transaction, and separately extract operation sequences of the black sample and the white sample and time difference information of adjacent operations; a feature conversion unit 602, configured to separately perform feature conversion and selection on the sample operation sequence and the time difference information to obtain an operation feature and a time difference feature; a similarity calculation unit 603, configured to calculate a similarity between the operation feature and the time difference feature; a feature combination unit 604, configured to combine a plurality of operation features based on the similarity, to obtain a combined operation feature; and a classification training unit 605, configured to train a deep learning network through classification based on the combined operation feature.

In an optional method, the feature conversion unit 602 is configured to perform feature conversion on the operation sequence and the time difference information to obtain an initial operation feature and an initial time feature; and separately perform dimension reduction and irrelevant feature removal operations on the initial operation feature and the initial time feature to select the operation feature and the time difference feature.

In an optional method, the similarity calculation unit 603 is configured to calculate an inner product of an operation feature matrix of the operation feature and a time difference feature matrix of the time difference feature to obtain the similarity between the operation feature and the time difference feature.

In an optional method, the feature combination unit 604 is configured to combine the plurality of operation features by calculating a sum of corresponding similarities or by taking a maximum value of corresponding similarities.

In an optional method, the deep learning network is trained based on an RNN algorithm, an LSTM algorithm, a GRU algorithm, or an SRU algorithm.

Figure 7:
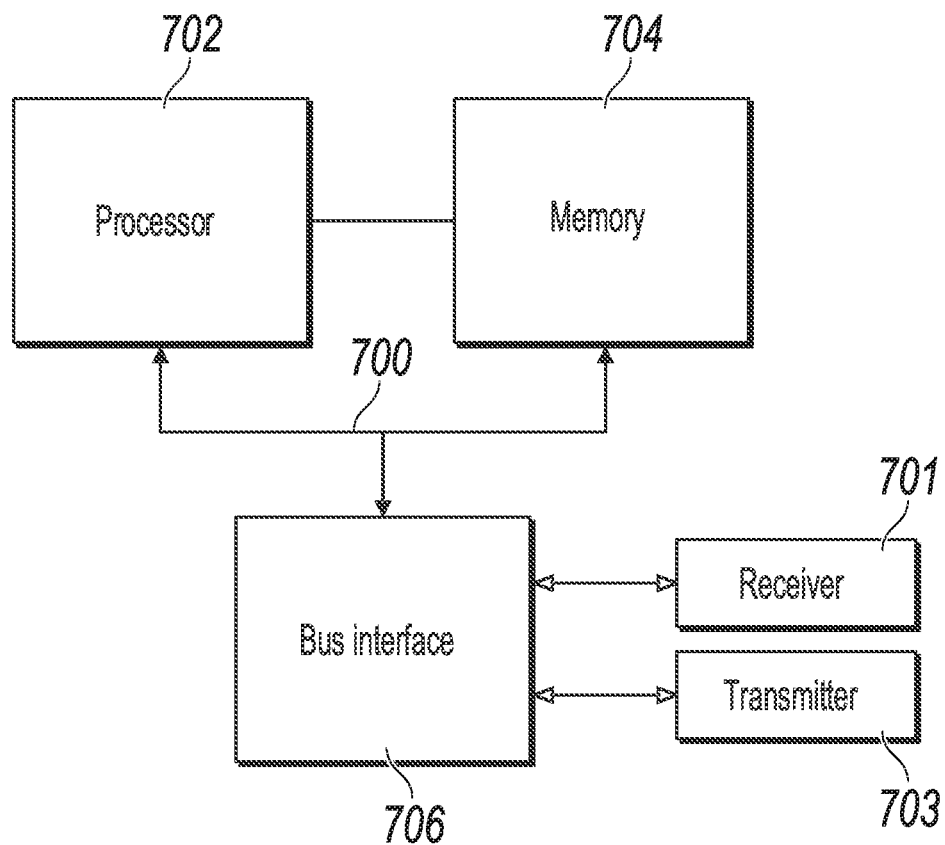
FIG. 7 is a schematic structural diagram illustrating a server, according to a fifth aspect of the implementations of the present specification.

According to a fifth aspect, based on an invention concept that is the same as that of the fraudulent transaction identification method or the deep learning network training method in the previous implementations, the present invention further provides a server. As shown in FIG. 7, the server includes a memory 704, a processor 702, and a computer program that is stored on the memory 704 and that can run on the processor 702. The processor 702 performs the steps of either the described fraudulent transaction identification method or the described deep learning network training method when executing the program.

In FIG. 7, a bus architecture (represented by a bus 700), namely, the bus 700 can include any quantity of interconnected buses and bridges, and the bus 700 connects various circuits including one or more processors represented by the processor 702 and memories represented by the memory 704. The bus 700 can further connect various other circuits such as a peripheral device, a voltage regulator, and a power management circuit, which is well known in the art, and therefore is not further described in the present specification. A bus interface 706 provides an interface between the bus 700, a receiver 701, and a transmitter 703. The receiver 701 and the transmitter 703 can be the same element, that is, a transceiver, and provide units that are configured to communicate with various other apparatuses on a transmission medium. The processor 702 is responsible for managing the bus 700 and for general processing, and the memory 704 can be configured to store data used when the processor 702 performs an operation.

According to a sixth aspect, based on an invention concept that is the same as that of the fraudulent transaction identification method or the deep learning network training method in the previous implementations, the present invention further provides a computer readable storage medium. The computer readable storage medium stores a computer program, and the steps of either the described fraudulent transaction identification method or the described deep learning network training method are performed when the program is executed by a processor.

The present specification is described with reference to the flowcharts and/or block diagrams of the method, the device (system), and the computer program product according to the implementations of the present specification. It should be understood that computer program instructions can be used to implement each process and/or each block in the flowcharts and/or the block diagrams and a combination of a process and/or a block in the flowcharts and/or the block diagrams. These computer program instructions can be provided for a general purpose computer, a dedicated computer, an embedded processor, or a processor of any other programmable data processing device to generate a machine, so that the instructions executed by a computer or a processor of any other programmable data processing device generate a device for implementing a specific function in one or more processes in the flowcharts and/or in one or more blocks in the block diagrams.

These computer program instructions can be stored in a computer readable memory that can instruct the computer or any other programmable data processing device to work by using a specific method, so that the instructions stored in the computer readable memory generate an artifact that includes an instruction device. The instruction device implements a specific function in one or more processes in the flowcharts and/or in one or more blocks in the block diagrams.

These computer program instructions can be loaded to a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred implementations of the present specification have been described, a person skilled in the art can make changes and modifications to these implementations once they learn the basic invention concept. Therefore, the following claims are intended to be construed as to cover the preferred implementations and all changes and modifications falling within the scope of the present specification.

Obviously, a person skilled in the art can make various modifications and variations to the present specification without departing from the spirit and scope of the present specification. The present specification is intended to cover these modifications and variations of the present specification provided that they fall within the scope of protection described by the following claims and their equivalent technologies.

Figure 8:
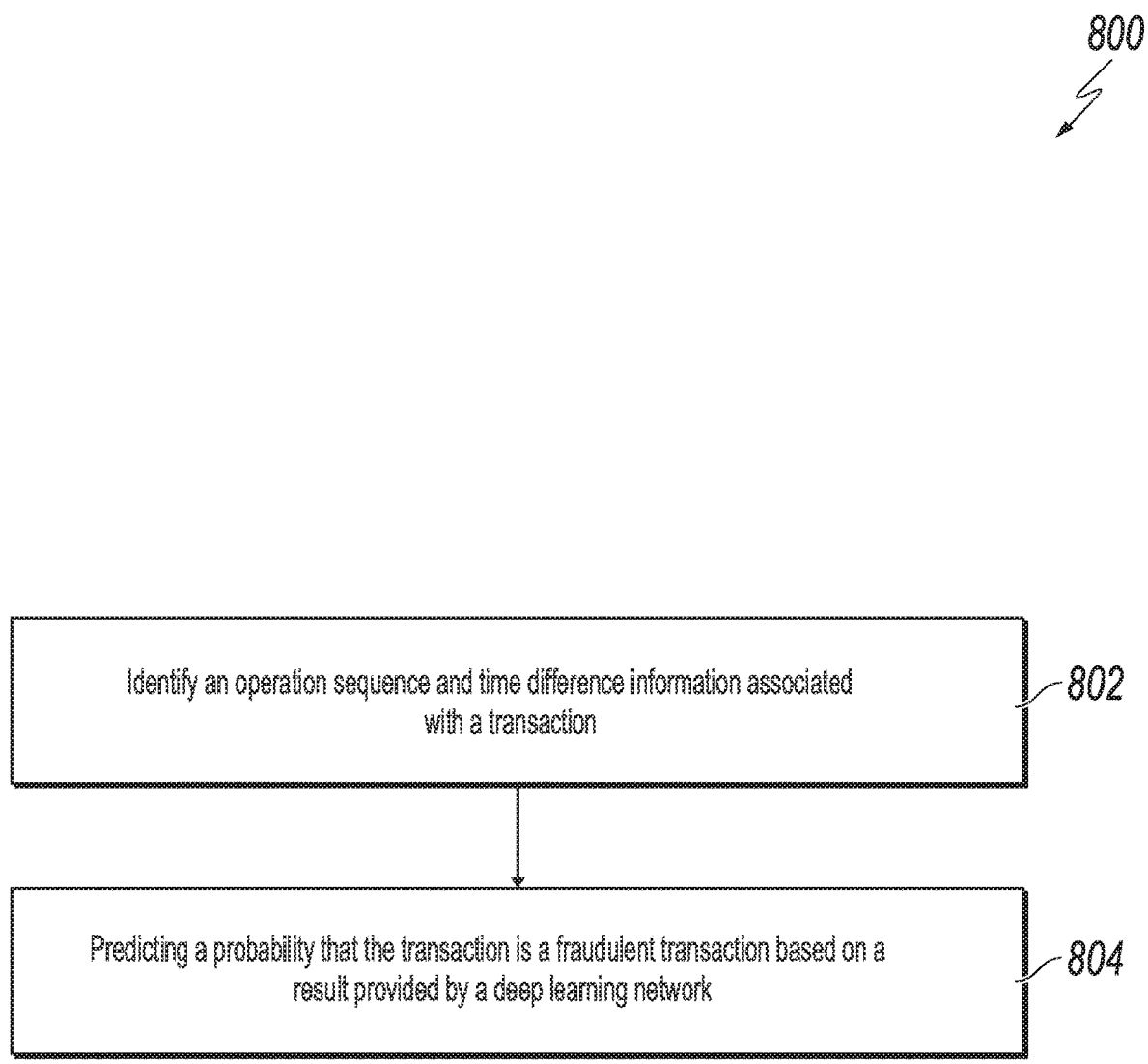
FIG. 8 is a flowchart illustrating an example of a computer-implemented method for identifying a fraudulent transaction using a deep leaning network, according to an implementation of the present disclosure.

FIG. 8 is a flowchart illustrating an example of a computer-implemented method 800 for identifying a fraudulent transaction using a deep learning network, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, an operation sequence and time difference information associated with a transaction are identified by a server. In some implementations, the transaction comprises a plurality of operations, wherein the operation sequence is an order associated with the plurality of operations, and wherein the time difference information comprises a time difference between each two adjacent operations included in the transaction. From 802, method 800 proceeds to 804.

At 804, a probability that the transaction is a fraudulent transaction is predicted by the server based on a result provided by a deep learning network, wherein the deep learning network is trained to predict fraudulent transactions based on operation sequences and time differences associated with a plurality of transaction samples, and wherein the deep learning network provides the result in response to input including the operation sequence and the time difference information associated with the transaction.

In some implementations, training the deep learning network includes obtaining a black sample associated with a fraudulent transaction and a white sample associated with a non-fraudulent transaction; separately extracting, from the black sample and from the white sample, an operation sequence and time difference information; performing a feature conversion and a selection on each of the operation sequences and on each of the time difference information that are extracted from the black sample and the white sample to obtain a number of operation features and a number of time difference features; calculating a similarity between each pair of the operation feature and the time difference feature that corresponds to a specific time point; combining more than one operation features based on the calculated similarity to obtain a combined operation feature; and training the deep learning network through classification based on the combined operation feature.

In some cases, performing a feature conversion and a selection on each of the operation sequences and each of the time difference information includes performing a feature conversion on each of the operation sequences and each of the time difference information to obtain an initial operation feature and an initial time feature; and separately performing a dimension reduction and an irrelevant feature removal on the initial operation feature and the initial time feature to select a number of operation features and time difference features.

In some implementations, calculating a similarity between each pair of the operation feature and the time difference feature that corresponds to a specific time point includes calculating an inner product of an operation feature matrix that includes operation features and a time difference feature matrix that includes time difference features to obtain a similarity between each of the operation features and the time difference features.

In some implementations, the plurality of operation features are combined by calculating a sum of corresponding similarities. In some cases, the deep learning network is trained based on at least one of a recurrent neural network (RNN) algorithm, a long short-term memory (LSTM) algorithm, a gated recurrent unit (GRU) algorithm, and a simple recurrent unit (SRU) algorithm. After 804, method 800 stops.

Implementations of the present application can solve technical problems in fraudulent transaction identification. Traditionally, the industry mainly uses methods such as logistic regression and random forest to detect fraudulent transactions in a fraud detection. Using such methods, the data processed by the user is extracted according to the user's full operation data. In fraud scenarios, the sequence of the user's behavior sequence and the operation time are also important factors, therefore, using conventional models can bring at least two problems. First, when using user access data, these models need to put all the data together to extract features, ignoring the important factor of the time duration between a user's operations. Second, even if the data of time duration is added to the full data to train the model, because the limitations of the traditional global model itself, the local features cannot be extracted, thus losing some of the user's local operation characteristics. Other models, such as LSTM that models the sequence data and then determines if the transaction is fraudulent, all ignore the influence of time factors.

Implementation of the present application provide methods and apparatuses for improving the identification of fraudulent transactions. According to the present disclosure, client (user side) proposes a transaction processing request to a server (network side), and the server parses the transaction processing request, and performs time-difference based exception identification on the transaction processing request. The server obtains a deep learning network by performing training in advance based on an operation sequence and a time difference similarity of a transaction sample, and predicts, by using the deep learning network, the probability that a transaction to be identified is a fraudulent transaction. In the implementations of the present invention, by combining a time factor and a deep learning network, a time-focused deep learning network is innovatively provided for fraudulent transaction identification, to find some associations of transaction operations in terms of time, thereby better identifying a fraudulent transaction. For example, by combing a time factor and the LSTM, a time-focused long short-term memory is innovatively provided. The memory can be used for both sequence modeling and time modeling, and can find some associations in the data. Compared with a conventional global variable model, the performance is improved by about 10% during fraudulent transaction identification.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   obtaining a plurality of black samples and a plurality of white samples of transactions for training a deep learning network, wherein the deep learning network comprises a feature embedding subnetwork and a classifier subnetwork;
   generating a combined operation feature value corresponding to each sample in the plurality of the black samples and the plurality of the white samples, comprising:
      extracting an operation sequence of the sample and time difference information of adjacent operations in the sample, wherein the operation sequence comprises a plurality of operations at a plurality of time points, and wherein the time difference information comprises a time difference between the time points of each two adjacent operations included in a transaction;
      obtaining an operation feature value of the sample at each time point of the operation sequence, wherein the operation feature value at each time point of the operation sequence is an output at each corresponding time point of the feature embedding subnetwork, wherein an input to the feature embedding subnetwork is the operation sequence of the sample;
      obtaining a time difference feature value of the sample at each time point of the operation sequence, wherein the time difference feature value at each time point of the operation sequence is an output at each corresponding time point of the same feature embedding subnetwork, wherein an input to the feature embedding subnetwork is the time difference information of adjacent operations in the sample;
      calculating a similarity between each pair of the operation feature value and the time difference feature value that corresponds to a specific time point;
      calculating the combined operation feature value corresponding to the sample by combining more than one operation feature values based on the similarity;
   predicting, by the classifier subnetwork and for each sample in the plurality of the black samples and the plurality of the white samples, a probability that the transaction associated with the sample is a fraudulent transaction based on the combined operation feature value of the sample; and
   training the deep learning network based on the probabilities corresponding to the respective samples in the plurality of the black samples and the plurality of the white samples.

2. The computer-implemented method of claim 1, wherein each black sample is associated with a fraudulent transaction and each white sample is associated with a non-fraudulent transaction.

3. The computer-implemented method of claim 1, wherein obtaining the operation feature value and the time difference feature value comprises:
   performing a feature conversion on the operation sequence and on the time difference information to obtain an initial operation feature value and an initial time feature value; and
   separately performing a dimension reduction and an irrelevant feature removal on the initial operation feature value and the initial time feature value to select the operation feature value of the sample at each time point of the operation sequence and the time difference feature value of the sample at each time point of the operation sequence.

4. The computer-implemented method of claim 1, wherein calculating the similarity between each pair of the operation feature value and the time difference feature value that corresponds to the specific time point comprises calculating an inner product of an operation feature matrix that includes a plurality of operation feature values and a time difference feature matrix that includes a plurality of the time difference feature values to obtain the similarity between each of the operation feature values and the time difference feature values.

5. The computer-implemented method of claim 1, wherein the more than one operation feature values are combined by calculating a sum of corresponding similarities.

6. The computer-implemented method of claim 1, wherein the deep learning network is trained based on at least one of a recurrent neural network (RNN) algorithm, a long short-term memory (LSTM) algorithm, a gated recurrent unit (GRU) algorithm, and a simple recurrent unit (SRU) algorithm.

7. The computer-implemented method of claim 1, wherein the plurality of operations in the operation sequence are sorted chronologically.

8. A non-transitory, computer-readable medium storing one or more instructions executable by a computer system to perform operations comprising:
   obtaining a plurality of black samples and a plurality of white samples of transactions for training a deep learning network, wherein the deep learning network comprises a feature embedding subnetwork and a classifier subnetwork;
   generating a combined operation feature value corresponding to each sample in the plurality of the black samples and the plurality of the white samples, comprising:
      extracting an operation sequence of the sample and time difference information of adjacent operations in the sample, wherein the operation sequence comprises a plurality of operations at a plurality of time points, and wherein the time difference information comprises a time difference between the time points of each two adjacent operations included in a transaction;

obtaining an operation feature value of the sample at each time point of the operation sequence, wherein the operation feature value at each time point of the operation sequence is an output at each corresponding time point of the feature embedding subnetwork, wherein an input to the feature embedding subnetwork is the operation sequence of the sample;

obtaining a time difference feature value of the sample at each time point of the operation sequence, wherein the time difference feature value at each time point of the operation sequence is an output at each corresponding time point of the same feature embedding subnetwork, wherein an input to the feature embedding subnetwork is the time difference information of adjacent operations in the sample;

calculating a similarity between each pair of the operation feature value and the time difference feature value that corresponds to a specific time point;

calculating the combined operation feature value corresponding to the sample by combining more than one operation feature values based on the similarity;

predicting, by the classifier subnetwork and for each sample in the plurality of the black samples and the plurality of the white samples, a probability that the transaction associated with the sample is a fraudulent transaction based on the combined operation feature value of the sample; and training the deep learning network based on the probabilities corresponding to the respective samples in the plurality of the black samples and the plurality of the white samples.

9. The non-transitory, computer-readable medium of claim 8, wherein each black sample is associated with a fraudulent transaction and each white sample is associated with a non-fraudulent transaction.

10. The non-transitory, computer-readable medium of claim 8, wherein obtaining the operation feature value and the time difference feature value comprises:

performing a feature conversion on the operation sequence and on the time difference information to obtain an initial operation feature value and an initial time feature value; and separately performing a dimension reduction and an irrelevant feature removal on the initial operation feature value and the initial time feature value to select the operation feature value of the sample at each time point of the operation sequence and the time difference feature value of the sample at each time point of the operation sequence.

11. The non-transitory, computer-readable medium of claim 8, wherein calculating the similarity between each pair of the operation feature value and the time difference feature value that corresponds to the specific time point comprises calculating an inner product of an operation feature matrix that includes a plurality of operation feature values and a time difference feature matrix that includes a plurality of the time difference feature values to obtain the similarity between each of the operation feature values and the time difference feature values.

12. The non-transitory, computer-readable medium of claim 8, wherein the more than one operation feature values are combined by calculating a sum of corresponding similarities.

13. The non-transitory, computer-readable medium of claim 8, wherein the deep learning network is trained based on at least one of a recurrent neural network (RNN) algorithm, a long short-term memory (LSTM) algorithm, a gated recurrent unit (GRU) algorithm, and a simple recurrent unit (SRU) algorithm.

14. The non-transitory, computer-readable medium of claim 8, wherein the plurality of operations in the operation sequence are sorted chronologically.

15. A computer-implemented system, comprising:

one or more computers; and one or more computer memory devices interoperably coupled with the one or more computers and having tangible, non-transitory, machine-readable media storing one or more instructions that, when executed by the one or more computers, perform operations comprising:

obtaining a plurality of black samples and a plurality of white samples of transactions for training a deep learning network, wherein the deep learning network comprises a feature embedding subnetwork and a classifier subnetwork;

generating a combined operation feature value corresponding to each sample in the plurality of the black samples and the plurality of the white samples, comprising:

extracting an operation sequence of the sample and time difference information of adjacent operations in the sample, wherein the operation sequence comprises a plurality of operations at a plurality of time points, and wherein the time difference information comprises a time difference between the time points of each two adjacent operations included in a transaction;

obtaining an operation feature value of the sample at each time point of the operation sequence, wherein the operation feature value at each time point of the operation sequence is an output at each corresponding time point of the feature embedding subnetwork, wherein an input to the feature embedding subnetwork is the operation sequence of the sample;

obtaining a time difference feature value of the sample at each time point of the operation sequence, wherein the time difference feature value at each time point of the operation sequence is an output at each corresponding time point of the same feature embedding subnetwork, wherein an input to the feature embedding subnetwork is the time difference information of adjacent operations in the sample;

calculating a similarity between each pair of the operation feature value and the time difference feature value that corresponds to a specific time point;

calculating the combined operation feature value corresponding to the sample by combining more than one operation feature values based on the similarity;

predicting, by the classifier subnetwork and for each sample in the plurality of the black samples and the plurality of the white samples, a probability that the transaction associated with the sample is a fraudulent transaction based on the combined operation feature value of the sample; and training the deep learning network based on the probabilities corresponding to the respective samples in the plurality of the black samples and the plurality of the white samples.

16. The computer-implemented system of claim 15, wherein each black sample is associated with a fraudulent transaction and each white sample is associated with a non-fraudulent transaction.

17. The computer-implemented system of claim 15, wherein obtaining the operation feature value and the time difference feature value comprises:
performing a feature conversion on the operation sequence and on the time difference information to obtain an initial operation feature value and an initial time feature value; and
separately performing a dimension reduction and an irrelevant feature removal on the initial operation feature value and the initial time feature value to select the operation feature value of the sample at each time point of the operation sequence and the time difference feature value of the sample at each time point of the operation sequence.

18. The computer-implemented system of claim 15, wherein calculating the similarity between each pair of the operation feature value and the time difference feature value that corresponds to the specific time point comprises calculating an inner product of an operation feature matrix that includes a plurality of operation feature values and a time difference feature matrix that includes a plurality of the time difference feature values to obtain the similarity between each of the operation feature values and the time difference feature values.

19. The computer-implemented system of claim 15, wherein the more than one operation feature values are combined by calculating a sum of corresponding similarities.

20. The computer-implemented system of claim 15, wherein the deep learning network is trained based on at least one of a recurrent neural network (RNN) algorithm, a long short-term memory (LSTM) algorithm, a gated recurrent unit (GRU) algorithm, and a simple recurrent unit (SRU) algorithm.

* * * * *